G. H. BROWN.
PEDAL CONTROL MECHANISM FOR GEARING.
APPLICATION FILED NOV. 14, 1916.
1,267,371.
Patented May 28, 1918.
4 SHEETS—SHEET 1.
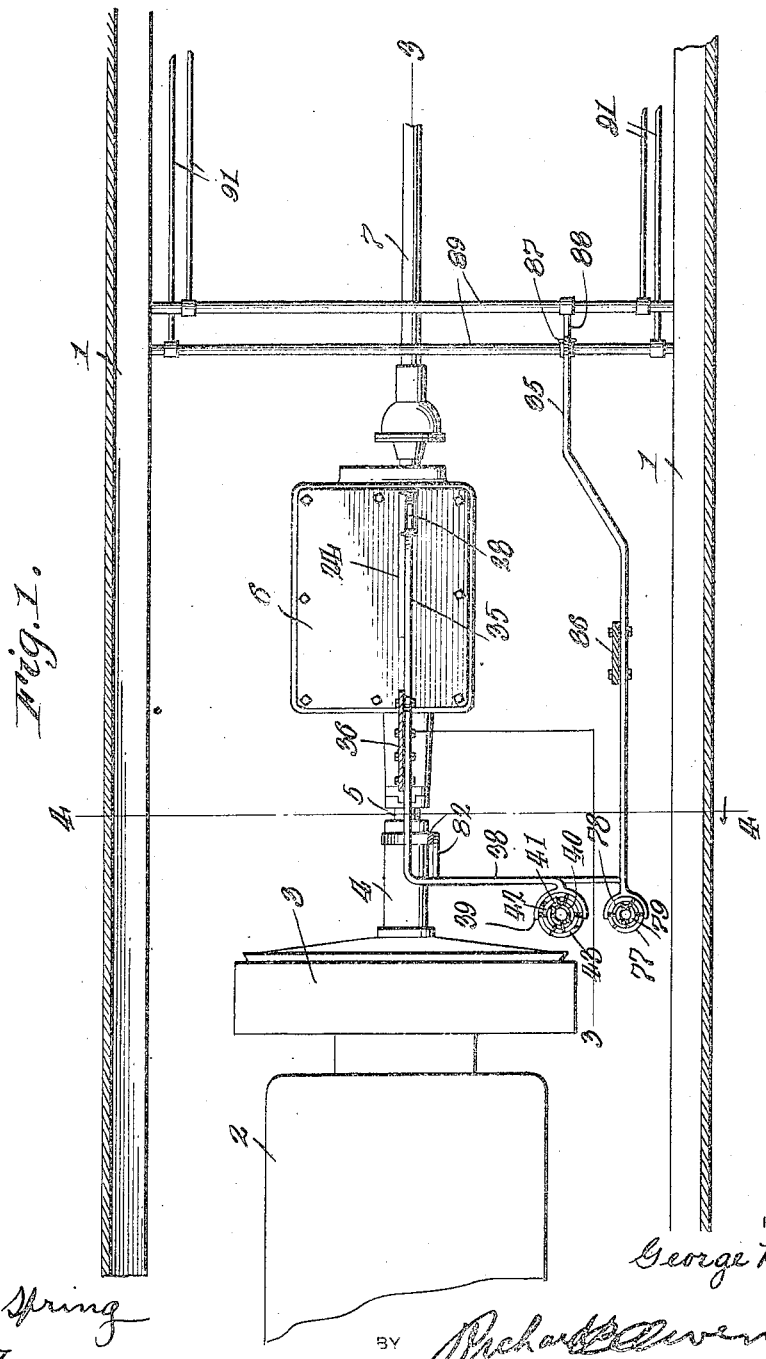

G. H. BROWN.
PEDAL CONTROL MECHANISM FOR GEARING.
APPLICATION FILED NOV. 14, 1916.
1,267,371.
Patented May 28, 1918.
4 SHEETS—SHEET 2.
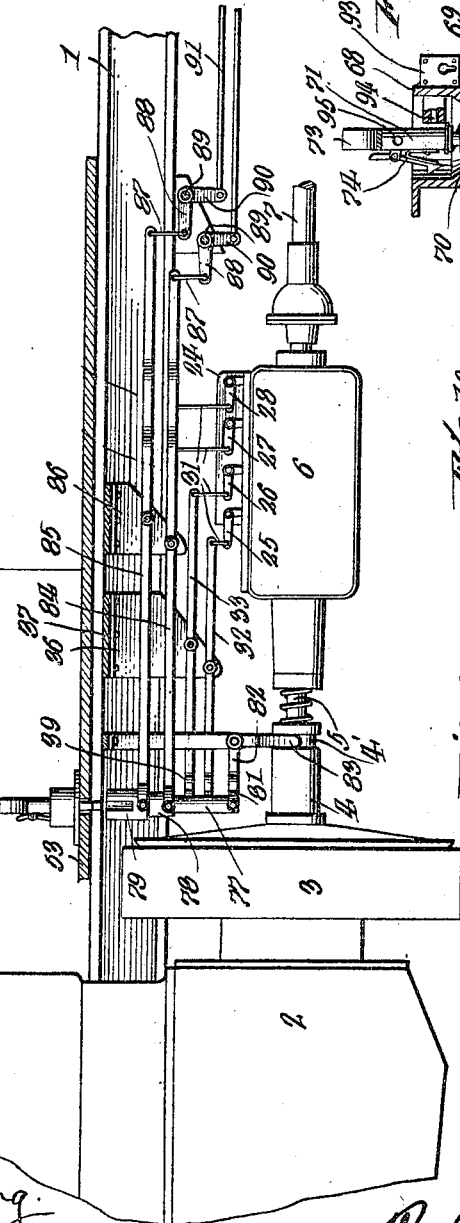
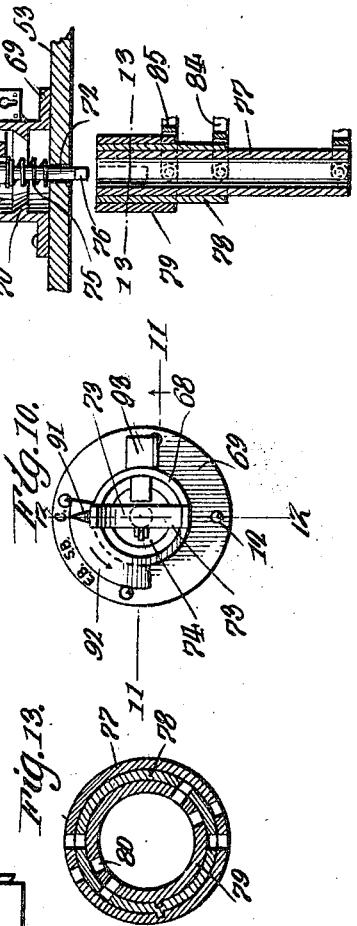
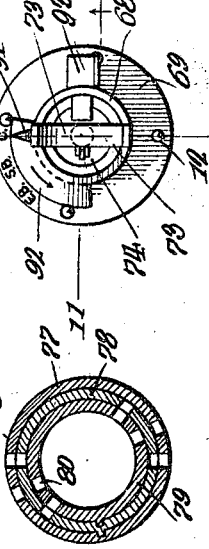
WITNESSES
INVENTOR
George H. Brown
BY
ATTORNEY

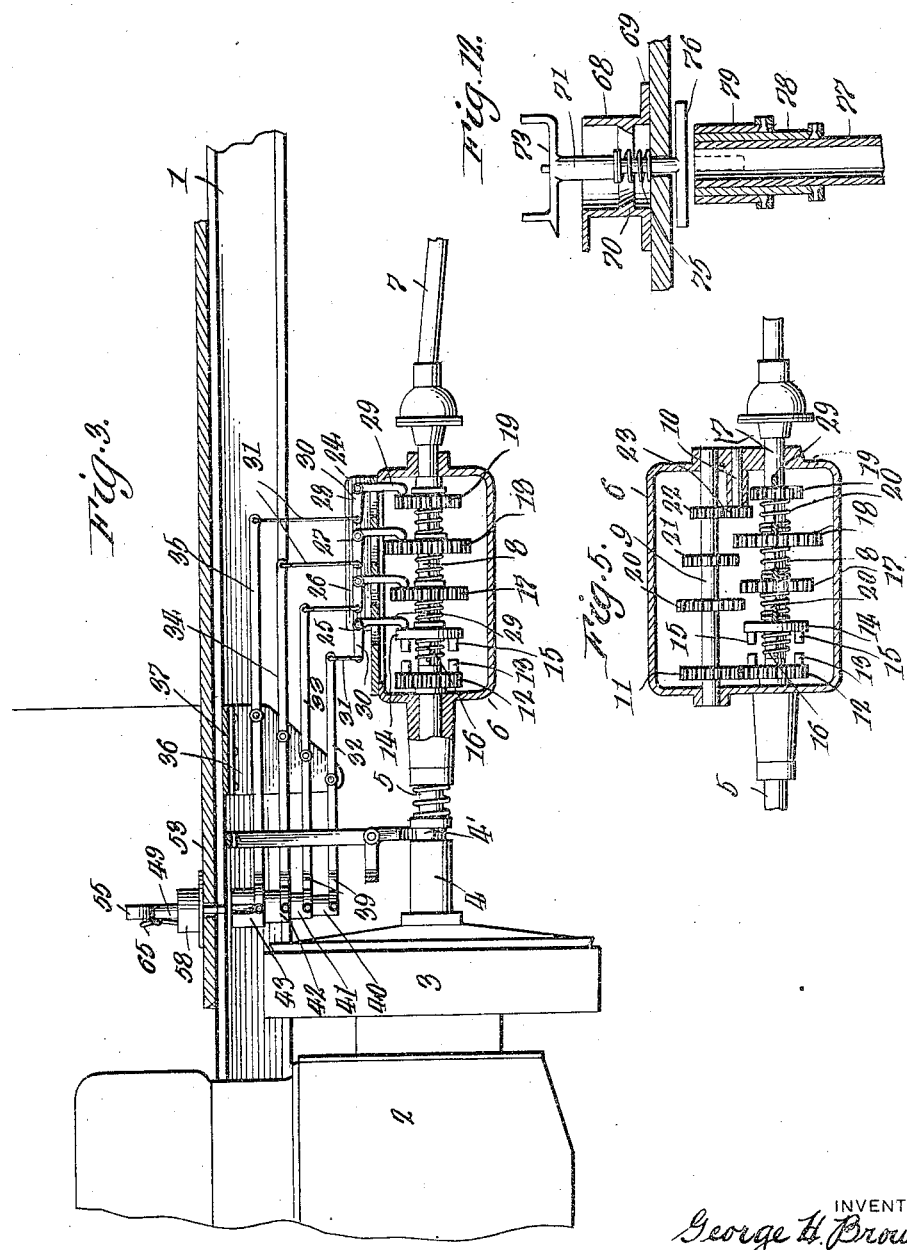

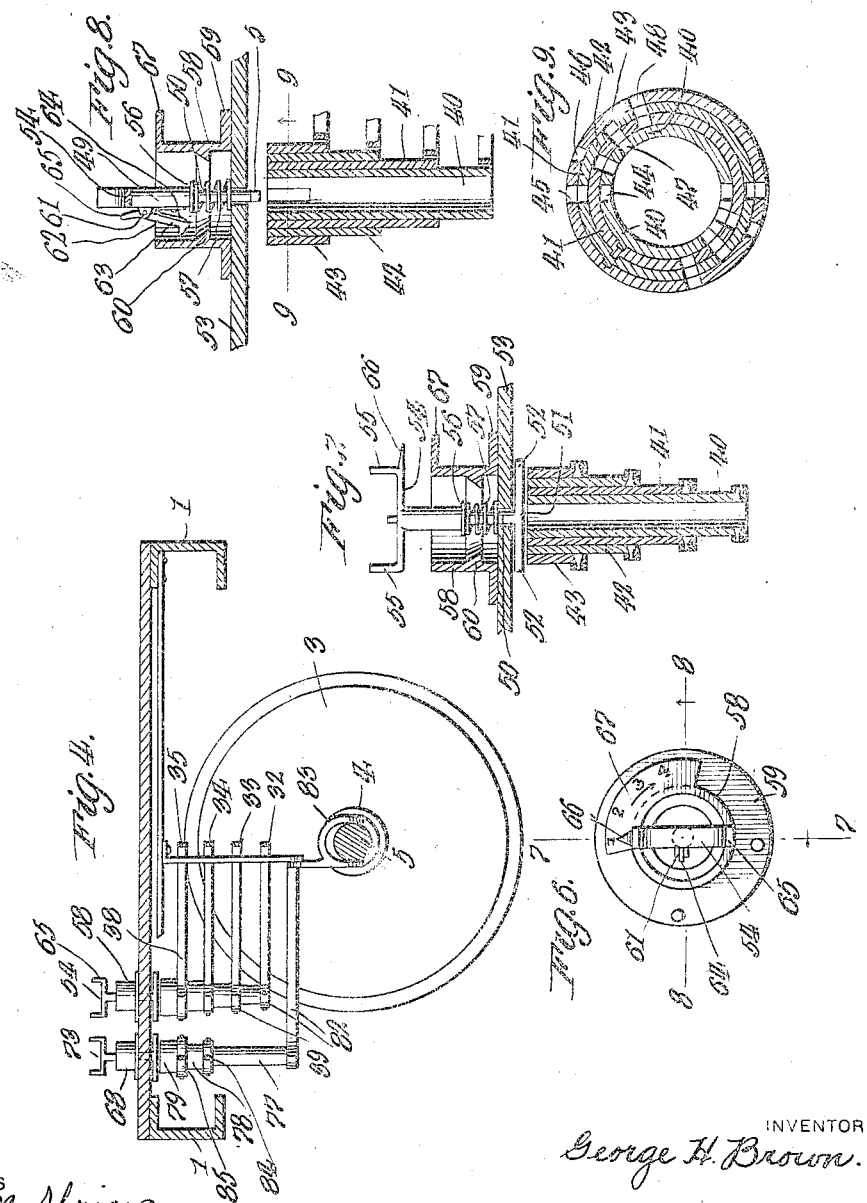

UNITED STATES PATENT OFFICE.

GEORGE H. BROWN, OF WILKINSBURG, PENNSYLVANIA.

PEDAL-CONTROL MECHANISM FOR GEARING.

1,267,371.

Specification of Letters Patent.  Patented May 28, 1918.

Application filed November 14, 1916. Serial No. 131,315.

*To all whom it may concern:*

Be it known that I, GEORGE H. BROWN, a citizen of the United States, residing at Wilkinsburg, in the county of Allegheny and State of Pennsylvania, have invented certain new and useful Improvements in Pedal-Control Mechanism for Gearing, of which the following is a specification.

This invention has relation to controlling devices for motor vehicles, or the like, and the nature and objects thereof will be readily apparent to those skilled in the art to which it appertains in the light of the following explanation of the accompanying drawings illustrating what I now believe to be the preferred embodiment, or mechanical expression of my invention, from among other forms and arrangements within the spirit thereof, and the scope of the appended claims.

However, an object of the invention is to provide means in a motor vehicle whereby one foot of the driver may actuate the transmission or speed changing mechanism of the vehicle, and the other foot utilized to actuate the clutch and braking mechanism thereby leaving the hands free for steering.

Another object of the invention is to provide in a controlling device for motor vehicles, means whereby the driver may select any combination of gears in a transmission for the production of a predetermined speed by properly actuating the controlling element which may be done entirely with one foot of the driver.

Another object of the invention is to provide a controlling device for motor vehicles of a construction, substantially in duplicate of the transmission control, for selecting and actuating a particular braking mechanism, or for similarly actuating the clutch, said actuation being performed entirely with one foot of the driver.

A still further object of the invention is to provide a brake actuating mechanism of the character described, which may be locked when desired to prevent unauthorized persons from operating the machine.

In addition to the foregoing my invention comprehends improvements in the details of construction and arrangement of parts to be hereinafter more fully described and particularly set forth in the appended claims.

In the accompanying drawings in which similar and corresponding parts are designated by the same characters of reference throughout the several views in which they appear:

Figure 1, is a fragmentary view in plan of the chassis of a motor vehicle illustrating the embodiment therein of my invention, Fig. 2, is a view in side elevation, partly in section of the mechanism shown in the preceding figure, Fig. 3, is a longitudinal vertical section taken on the line 3—3 of Fig. 1.

Fig. 4, is a transverse sectional view taken on the line 4—4 of Fig. 1.

Fig. 5, is a horizontal detail section taken through the transmission case.

Fig. 6, is a detail view in plan of the foot operated device for selecting and actuating the transmission mechanism.

Fig. 7, is a detail vertical section taken on the line 7—7 of Fig. 6.

Fig. 8, is a similar section taken on the line 8—8 of Fig. 6.

Fig. 9, is a transverse horizontal section taken on the line 9—9 of Fig. 8.

Fig. 10, is a detail view in plan of the foot controlled device for actuating the braking mechanism and the clutch.

Fig. 11, is a vertical detail section taken on the line 11—11 of the preceding figure.

Fig. 12, is a similar view taken on the line 12—12 of Fig. 10, and

Fig. 13 is a detail transverse section taken on the line 13—13 of Fig. 11.

With reference to the drawings, 1 indicates the longitudinal frame bars of a chassis, 2 the motor, and 3 the clutch. The clutch is operable through the longitudinal movement of a sleeve 4, forming a part thereof, and having a circumferential groove 4' for the reception of the actuating means therefor. The drive shaft indicated at 5 is extended from the clutch into the casing of a transmission element indicated at 6 and containing a novel transmission arrangement forming a part of my invention. The driven shaft 7 extends rearwardly of the transmission casing to the rear drive wheels (not shown).

The transmission mechanism of my invention which is inclosed within the casing 6, includes the driven shaft 7 which extends through the interior of the casing and is formed with a squared portion 8. The squared portion 8 of the driven shaft is disposed in alinement with the drive shaft 5, and these shafts may be loosely connected for mutual support, but for independent rotation. Disposed parallel to the driven shaft is a countershaft 9, and adjacent the rear end of the casing between the shafts 7 and 9, is an intermediate shaft 10. Adjacent the forward end of the casing, the countershaft is provided with a fixedly mounted countershaft gear 11 for meshing engagement with a drive gear 12 fixedly secured to the drive shaft. Said driving gear having on its rearward face a pair of oppositely disposed lugs 13. Mounted upon the square portion 8 of the driven shaft is a direct drive disk 14 having upon its forward face a pair of oppositely disposed projecting lugs 15, adapted for engagement with the lugs 13, but normally retained out of such engagement by means of a coil spring 16, which is interposed between the said disk and the drive gear 12. The disk 14 is adapted for rotation with the driven shaft, and also for longitudinal movement thereon, as well as a trio of gears mounted upon the square portion in spaced relation, comprising low and high speed gears 17 and 18 respectively and a reversing gear 19. Coil springs 8' are interposed between these gears whereby they are normally disposed toward an extreme rearward position. Fixedly secured to the counter shaft 9 are low high and reversing gears 20, 21 and 22 respectively, adapted for meshing engagement with the transmission gears 17 and 18, the reversing gear 23 being constantly in meshing engagement with an idler pinion 23 mounted upon the shaft 10. Mounted upon the top plate of the casing is a vertically extending plate 24 upon which are pivotally mounted a series of bell cranks designated from left to right respectively at 25, 26, 27 and 28, the bell cranks are provided with depending arms 29, which in each instance are in contact with the rear faces of the reversing disk 14 and the said transmitting gears 17, 18 and 19. The bell cranks 25 to 28 inclusive, are provided with horizontal arms 30 which in each instance are connected by means of vertically extending links 31 to the rear end of a plurality of horizontal levers disposed in superposed relation, and designated from the lowermost in order as 32, 33, 34 and 35. The horizontal levers are in each instance fulcrumed at their intermediate portions upon plates 36 secured to the under side of the transverse frame bar 37 of the chassis. In the present instance, the forward ends of the levers are formed with the right angular extensions 38 extending either to the right or the left depending upon whether the vehicle is of the right or left hand type drive, and each lever is formed at the extremity of said bent portions with bifurcated portions 39. The foot control for selecting any combination of gears within the transmission case and which forms a part of my invention, is illustrated in detail in Figs. 6 and 9 inclusive, from which it will be seen that it comprises a plurality of vertically extending concentric tubular members corresponding in number to the number of shipper levers for shifting the gears. The sleeves are designated in order from the innermost as 40, 41, 42 and 43, the innermost sleeve being longer than its neighbors, and the sleeve 43 the shortest, the length of the remaining being intermediate of the members at either side thereof. The top surfaces of the tubular members are however disposed upon a level and formed with surfaces which are flushed throughout. Each tubular member is formed at its upper end with downwardly extending slots 44 each tubular member having a pair of opposed series, in the present instance of which there are three openings in each series, with pairs of openings at opposite sides of each member in diametrical alinement. It is to be noted in connection with Fig. 9 that the openings in the sleeve are variously spaced, and relatively arranged in a different order. In whatever order may be employed in arranging the opening of the sleeves or tubular members, only the openings of three of the tubular members may be in alinement at one time. The alined relation being interrupted by intersection of a solid portion of one of the tubular members, thus, at 45 in said figure the alinement of the slots or openings is interrupted by the solid portion of the tubular member 41, and at 46 the alinement of the openings is similarly interrupted by the interposition of the solid portion of the sleeve or tubular member 42. Similarly, at 47 the alinement of the slots is interrupted by the interposition of the solid portion of the outer sleeve 43, and at 48 the solid portion of the inner sleeve 40 interrupts the alined relation of the last series of openings. Thus, four arrangements of openings are provided and in each instance the alinement is interrupted by the interposition of the solid portion of the tubular members.

Mounted above the controlling element, partly constituted by the tubular members, is a vertically reciprocable foot pedal designated generally at 49 having a downwardly depending shank 50 movable in a path coincident with the vertical central axis of the tubular members, the lower end of the shank having a T-shaped portion 51 in the form of oppositely extending arms 52 which are adapted to extend diametrically across the upper ends of the tubular members and to the exterior surface of the outside member 43 of the series. The shank is mounted for reciprocation in a supporting member 53 which bears a fixed relation to the supporting plate 36 of the shipper levers and also the transmission mechanism, and the upper end of the shank is formed with a foot rest 54 comprising a horizontal portion having upwardly extending members 55 adapted to engage the opposite sides of the shoe sole, whereby said member may be rotated by twisting the foot as well as reciprocated by pressing upon the same. The shank of the foot pedal is provided with a flange 56 and a coil spring 57 is encircled about the shank and disposed between the flange and the support 53 whereby the pedal may be disposed in a normally raised position. An annular vertically extending flange 58 is encircled about the foot pedal and is provided with a laterally extending annular flange whereby the same is secured to the support 53 the annular flange 58 having an inner annular shoulder 60. The pedal is provided at one side with spaced ears 61 in which to receive the pivoted latch member 62 having a lower hook portion 63 adapted to engage the shoulder 60, the said latch being urged toward engagement by means of a leaf spring 64. The upper end of the latch member is formed with an extension 65 which is disposed above the level of the horizontal member of the foot piece 54 whereby it may be engaged by the sole of the shoe.

In operation, and assuming that a combination of gears are to be utilized in the transmission for the production of low speed, the foot pedal 49 is rotated by twisting the foot which has been previously disposed between the members 55 of the foot pedal, until a pointer 66 on the foot pedal is brought opposite the numeral 1 on a dial plate 67 extending from the upper edge of the annular flange 58. Owing to this movement of the pedal, the oppositely extending arms 52 at the lower end thereof will be disposed above the series of slots in the tubular members located at the point 45 in Fig. 9, it will be noted that at this point, the alined series of slots is interrupted by the interposition of a solid portion of the sleeve 41. The arms 52 are of a size to easily enter the slot and when the foot pedal is now depressed against the tension of its spring 57, said arms will enter the alined series of slots and thus engage the upper edge of the tubular member 41, whereupon continued depression of the foot pedal depresses said tubular member 41, which in turn being connected to the forward end of the shipper lever 33 mentioned above, the rear end of said lever is raised, thereupon rocking its bell crank member 26, and thereby urging the gear 17 forward against the tension of the spring 8' until said gear is brought into mesh with the gear 20 of the countershaft 9, whereupon the transmission of power from the drive shaft 5 is through the gear 12 to the gear 11 from the gear 20 of the countershaft to the gear 17 of the driven shaft. In a similar manner the foot pedal is rotated to bring the oppositely extending arms 52 over any of the alined series of openings in the tubular members, any one of the tubular members may be depressed and the associated parts thereof actuated to cause the meshing engagement of other gears. When it is desired to institute a direct drive the direct drive disk 14 is moved forward through the medium of its associated bell crank and shipper lever which in turn is operated by the depression of the innermost sleeve 40 until the lugs 15 of said disk and the lugs 13 of the gear 12 are brought into engagement, whereupon the rotation of the drive shaft 5 is directly imparted to the driven shaft 7, without the interposition of any gearing. By shifting the gear 19 in a forward direction, it may be brought into engagement with the idler pinion 23, whereupon a reverse drive is effected through the drive shaft, and countershaft, and through said idler pinion to the gear 19, upon the driven shaft.

For operating the clutch and braking mechanism of a motor vehicle, an arrangement may be provided which is mechanically a duplicate of the foot pedal arrangement before set forth, and which is set forth in detail in Figs. 10 to 13 inclusive. The foot pedal for actuating the clutch and brake may be located closely adjacent the foot pedal for actuating the transmission, and in a similar manner includes a cylindrical member 68 mounted upon the support 53 through the medium of an annular flange 69, the inner surface of the cylindrical member being provided with an annular shoulder 70. The foot pedal designated generally at 71 is provided with a downwardly extending shank 72 and a foot rest 73 constructed in a manner exactly similar to the foot rest in the transmission pedal. The pedal under discussion is provided with a latch 74 for engagement with the shoulder 70 of the cylindrical member, whereby the foot pedal may be retained in a lowered position against the tension of the spring 75 which acts to retain the foot pedal in normally raised position. The shank is provided with oppositely extending arms 76 and disposed beneath the arms is a plurality of sleeves or tubular members in concentric relation designated from the innermost as 77, 78 and 79. The upper surfaces of the tubular members are in alinement, and provided with the series of slots 80 arranged in relative order in a manner set forth in connection with that in the transmission members whereby if the pedal is depressed any one of the tubular members may be engaged for consequent depression, depending upon the rotative position to which the foot pedal is adjusted. The sleeves 77, 78 and 79, are of different lengths, and the innermost is the longest and is connected at its lower end to the bifurcated end 81 of a bell crank 82 having a depending portion 83 which is seated with the groove 5 of the clutch actuating sleeve 4. The lower end of the tubular members 78 and 79 are connected respectively to the forward end of the rearwardly extending levers 84 and 85 respectively which are fulcrumed at an intermediate point to a depending plate 86 to the under side of the transverse frame bar 37 which also supports the plate 36. The rear ends of the levers 84 and 85 are connected through the medium of depending links 87, to the horizontal arms 88 of a pair of shafts 89 having depending arms 90 connected by means of rearwardly extending rods 91, to the service and emergency brakes (not shown).

In operation, and assuming that the clutch is to be thrown into engagement, the foot pedal is rotated by the foot in a manner similar to the transmission pedal, and a pointer 91 on the pedal brought adjacent the letter C inscribed upon a dial 92 formed upon the cylindrical member 68 and the foot pedal is then depressed, whereupon the arms 76 at the lower end thereof are engaged upon the upper surface of the inner sleeve 77, whereupon the bell crank 82 is rocked and the clutch actuating sleeve 4 is shifted rearwardly. To actuate either the service or emergency brake, the foot pedal is rotated to bring its pointer opposite the corresponding point upon the dial, and the foot pedal depressed whereupon either the sleeve 78 or 79 as the case may be is depressed with the result that the corresponding lever 85 or 86 is oscillated and either of the said rods 91 shifted to actuate the braking mechanism. To retain the clutch in engagement, or either of the braking mechanisms in set position, the foot pedal is depressed until the latch member 74 is engaged beneath the shoulder 70 whereupon the tubular member engaged will be held depressed, and the associated mechanism retained in adjusted position. To release the latch, it is but necessary to engage the upper projecting ends thereof with the foot to cause disengagement of the lower end with the shoulder 70 whereupon the spring 75 which is encircled about the shank 72 of the foot pedal will urge the foot pedal again to a raised position, and thus permit the return of the depressed tubular member to its former position.

To lock the braking mechanism in set position when the vehicle is left by the driver, and thereby prevent unauthorized persons from starting the vehicle, I provide a locking mechanism which is located upon the annular sleeve member 68 of the brake control. The casing of the lock is indicated at 93, and is adapted to reciprocate a radially extended bolt 94 within the cylindrical casing 93. The vertical shank of the foot pedal is provided at one side with an opening 95 of a size sufficient to receive the bolt 94, and when the foot pedal is rotated and depressed to bring the braking mechanism into set position, said opening 95 should be disposed opposite to and in alinement with the bolt 94. If the locking mechanism is now actuated by its key to dispose the bolt within the opening 95, the bolt will be held in said position, and the braking mechanism held set.

While I have illustrated and described my invention with some degree of particularity, I realize that in practice various alterations thereover may be made, and I therefore reserve the right and privilege of changing the form of the details of construction or otherwise alter the arrangement of the parts without departing from the spirit of the invention, or the scope of the appended claims.

Having thus described my invention what I claim as new and desire to secure by Letters Patent is:—

1. In a motor vehicle, a controlling device comprising a spring pressed depressible foot pedal mounted for rotative movement, means operable by the rotative movement of said foot pedal to select a mechanism to be actuated, and means operable by depression of said foot pedal in any position in which it may be rotated for producing such actuation.

2. In a motor vehicle, a foot operated controlling device including a plurality of contiguously disposed movable elements, each operatively connected to a mechanism to be actuated, and a rotatable and depressible foot operated pedal to select one of the movable elements to be moved, whereby upon depression of said foot operated element, one of the selected movable elements may be engaged and moved and its associated mechanism actuated.

3. In a motor vehicle, a foot operated controlling device, including a plurality of contiguously disposed vertically reciprocable movable elements each operatively connected to a mechanism to be actuated, a foot operated element mounted for reciprocation and rotative movement, and means operable by means of the foot operated means to bring the same into position for engaging any one of the reciprocable elements whereby the selected elements may be moved by depressing the foot operated means to actuate the associated mechanism.

4. In a motor vehicle, a foot operated controlling device including a plurality of concentric tubular members slidable within each other, means connected with the several tubular members to actuate particular mechanisms, a foot operated element mounted for reciprocatory and rotative movement, and means rotatable with said foot operated means for selecting one of the tubular members whereby when said foot operated element is depressed the selected tubular member may be moved to actuate its associated mechanism.

5. In a motor vehicle, a foot operated controlling device, including a plurality of concentric tubular members movable within each other, means operatively connecting each of said members with a particular mechanism to be actuated, each of said tubular members being provided at their upper ends with a plurality of openings arranged in a number of series corresponding to the number of tubular elements used and wherein the openings of each tubular member in the series are in alinement except where such alined relation is interrupted by the solid portion of one of the tubular elements, a foot operated element mounted for reciprocation and rotative movement over the tubular members and having a member adapted to enter the openings whereby upon rotating said foot operated element to dispose the same over a set of openings in the series, the member may be depressed to enter the openings without moving any of the tubular members except the one whose solid portion intersects the set of openings selected, whereby said member may be moved and its associated mechanism actuated.

6. In a motor vehicle, a foot operated means including a plurality of concentric relatively slidable sleeves, means operatively connecting each to a particular mechanism to be actuated the upper ends of the said sleeves being flush and formed each with a plurality of longitudinally extending slots, the slots of each sleeve being relatively arranged in alinement until such alined relation is interrupted by the solid portion of a sleeve whereby a series of alined openings are provided corresponding in number to the number of sleeves, each series being interrupted by a different sleeve, a foot operated element mounted for movement longitudinally of the sleeves and for rotative movement, an angular portion on said element adapted to enter any series of openings whereby when the said element is depressed, the intersected sleeve in the series may be moved to actuate its associated mechanism.

7. In a motor vehicle, a foot operated control mechanism including a plurality of concentric relatively slidable sleeves, means connecting each sleeve with a particular mechanism to be actuated, a foot operated element mounted for reciprocatory and rotative movement, means whereby said element may be rotated to select a sleeve for operation, whereby said sleeve may be depressed to bring about engagement therebetween and thereby actuate the associated mechanism, and releasable foot operated means for retaining said element in depressed position.

8. In a motor vehicle, a foot operated control mechanism including a plurality of concentric relatively slidable sleeves, means connecting said sleeves with a particular mechanism, a foot operated element mounted for reciprocatory and rotative movement, means whereby said element may be rotated to select a sleeve for operation whereby said sleeve may be depressed to bring about engagement therebetween and thereby actuate the associated mechanism, a foot operated spring pressed latch mounted upon said element, and stationary keeper engageable by said latch to retain said element in depressed position.

9. In a motor vehicle including a transmission mechanism, the combination of a plurality of concentric slidable sleeves, means connecting each sleeve with a set of gears to be actuated, a foot operated element mounted for reciprocatory and rotative movement, and means whereby when said element is rotated any one of the sleeves may be selected for engagement, and whereby said selected sleeve may be engaged upon depression of the foot element to actuate the associated mechanism and consequently actuate the corresponding set of gears.

10. In a motor vehicle including a transmission mechanism, a foot operated means for operating said transmission including a plurality of concentric relatively slidable sleeves, means connecting each sleeve with a set of gears to be actuated, a foot operated element mounted for reciprocatory and rotative movement whereby when said element is rotated any particular sleeve may be selected for engagement and whereby said sleeve may be engaged upon the rotation of the element to thereby actuate the sleeve selected to actuate its associated gears, and releasable foot operated means for retaining the element in depressed position and subsequently the gears in engagement.

In testimony whereof I affix my signature in presence of two witnesses.

GEO. H. BROWN.

Witnesses:
WALTER J. STROHMER,
JAMES RAMSAY.